United States Patent [19]
Wagenfeld

[11] 3,735,100
[45] May 22, 1973

[54] LINEAR DISTANCE-SPEED-TIME COMPUTER

[76] Inventor: Gilbert B. Wagenfeld, 30 Derwen Road, Bala Cynwyd, County of Montgomery, Pa. 19004

[22] Filed: Aug. 19, 1971

[21] Appl. No.: 173,071

[52] U.S. Cl. .............................235/89 R, 235/61 NV
[51] Int. Cl. ................................................G06g 1/16
[58] Field of Search .......................235/61 NV, 89 R, 235/61 V; 33/1 SB

[56] References Cited

UNITED STATES PATENTS

| | | | |
|---|---|---|---|
| 2,179,531 | 11/1939 | Trapnell | 235/89 R |
| 2,487,590 | 11/1949 | Rehill | 235/89 R |
| 2,508,898 | 5/1950 | Stronstorff | 235/61 NV |
| 3,282,501 | 11/1966 | Copeland | 235/78 |
| 3,514,582 | 5/1970 | Sanderson | 235/61 NV |
| 3,638,311 | 2/1972 | Chin | 33/1 SB |

*Primary Examiner*—Stephen J. Tomsky
*Attorney*—Leon Edelson and Walter B. Udell

[57] ABSTRACT

A computer for air navigation and the like having a distance scale for use with sectional maps drawn on a distance scale matching that of the computer, the said computer in addition to its said distance scale having coordinated ground speed and time scales and a pair of cursors which are not only shiftable relatively to one another but are also conjointly shiftable relatively to a main supporting member having said three scales marked thereon, thereby enabling an index point on one of said cursors to be brought into registry with intersecting graduation lines of any two of said scales, whereby any one of the three parameters of distance, ground speed or time may be readily determined where two of said parameters are known.

6 Claims, 7 Drawing Figures

PATENTED MAY 22 1973　　　3,735,100

INVENTOR
GILBERT B. WAGENFELD
BY
Edelson and Udell
ATTORNEYS.

LINEAR DISTANCE-SPEED-TIME COMPUTER

This invention relates generally to computer devices and more particularly to a new and novel air navigation computer for easily and quickly determining any one of three factors, namely, (1) time required to fly a given distance based upon a known ground speed: (2) ground speed required for flight over a desired distance within a given time; and (3) distance which may be flown during a given time based upon a known ground speed.

While there are currently in use quite a number of computers designed for air navigation purposes, they are all quite complex and difficult to use particularly during a flight when the pilot's attention must be concentrated on safely maintaining his craft in flight and on course.

Among the objects of the present invention is the provision of a simple and easily manipulatable computer which may be held in the hand and which includes hand-actuated relatively movable elements adapted to be positionally adjusted relatively to one another and to time, speed and distance scales printed upon a support for said elements to quickly ascertain by direct reading on the appropriate scale the desired time, speed or distance value desired to be known.

A further object of the invention is to provide a computer having a distance scale which indicates either nautical miles or statute miles correlated to a ground speed scale indicating knots for the nautical mile distance scale or miles per hour for a statute mile distance scale, both of which distance and speed scales are coordinated in turn to a time scale graduated in minutes.

Still another object is to provide a computer of the character above described which is coordinated in relation to the Sectional Aeronautical Charts published by the Environmental Science Services Administration of the United States Department of Commerce and thus is designed for use with such charts not only during a given flight but also for use in the preparation of flight plans.

Other objects and advantages of the present invention will be apparent more fully hereinafter, it being understood that the invention consists in the combination, construction, location and relative arrangement of parts, as shown in the accompanying drawings, as described in detail hereinafter and as finally pointed out in the appended claims.

In the drawings, which are illustrative of the computer having distance and speed scales graduated respectively in nautical miles and knots:

Figure 1:
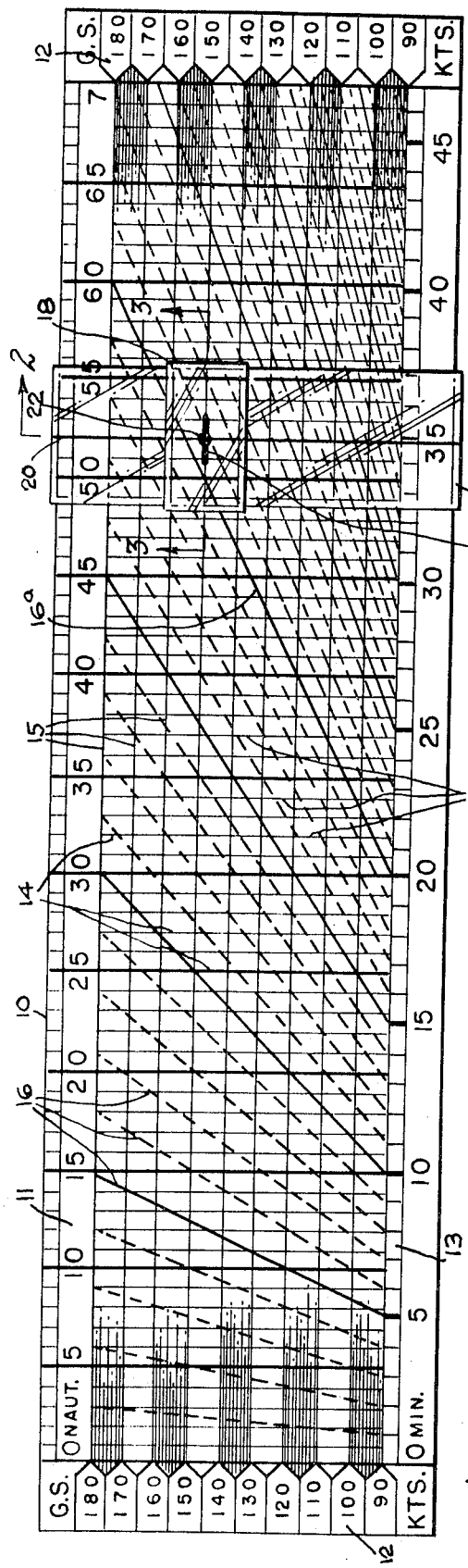
FIG. 1 is a plan view of a preferred embodiment of the flight computer constructed in accordance with the present invention.
Figure 2:
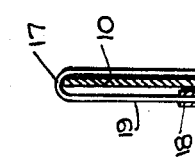
FIG. 2 is a sectional view thereof as taken along the lines 2—2 of FIG. 1.
Figure 3:
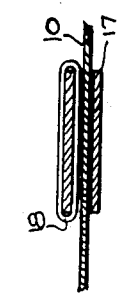
FIG. 3 is a sectional view taken along the line 3—3 of FIG. 1.
Figures 5, 6, 7:
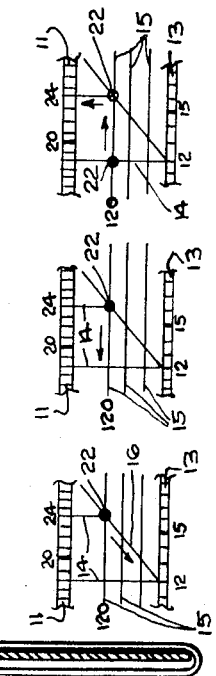
Figure 4:
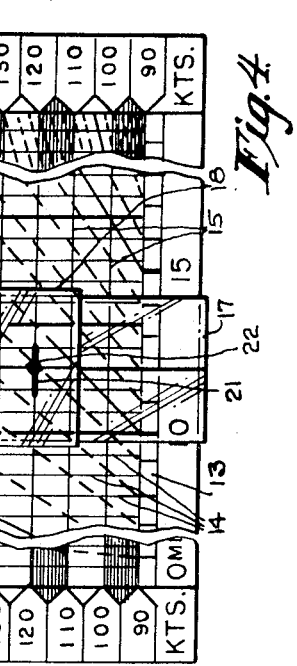

FIG. 4 is a partial plan view similar to FIG. 1 but showing the slides of the computer relatively shifted into positions different from these shown in FIG. 1; and FIGS. 5, 6 and 7 are diagrammatic views respectively illustrating different examples of settings of the computer slides for determination of time, speed and distance values. rectangular Referring now more particularly to FIG. 1, it will be observed that the computer of the present invention includes a flat main body member 10 of elongated rectangular shape formed of any suitable relatively stiff material, such as metal, plastic or other composition having an opaque surface upon which is printed or otherwise applied along its top edge a distance scale 11 which in the illustrated form is graduated in nautical miles ranging from zero to 70.

In addition to this distance scale 11, the opaque face of the body member 10 is provided along each of its opposite ends with corresponding ground speed scales 12—12 graduated in the illustrated computer in knots ranging from a low ground speed of 90 knots to a high ground speed of 180 knots. As has been indicated hereinabove, the mileage scale may be graduated in statutary miles per hour or in kilometers per hour, in which instances the ground speed scales would be respectively graduated in miles per hour on kilometers per hour.

Also applied to the opaque face of the member 10 along its bottom edge is a time scale 13 graduated in minutes ranging from 0 to 50 minutes.

The distance scale 11 is indexed transversely across the width of the body member 10 by uniformly spaced vertically extending parallel lines 14 the spacing of which is such that from left to right of the computer they successively indicate the distances as read on the distance scale 11. Similarly, the ground speed reading on the ground speed scales 12—12 are indicated lengthwise across the full length of the body member 10 by uniformly spaced horizontally extending parallel lines 15.

The body member 10 also has applied to its frontal face a series of angularly related spaced lines 16 extending across the lines 14 and 15 in such manner that they respectively constitute lines of different constant times in coordination with the several time intervals indicated on the time scale 13, which constant time slant lines 16 each extend between a pair of points respectively located along the distance scales for the minimum and maximum ground speeds shown on the ground speed scales 12—12 of the computer. Thus, for example, the slant line 16a is a linear representation of a constant time of 20 minutes coordinated to a distance of 30 nautical miles at a ground speed of 90 knots and a distance of 60 nautical miles at a ground speed of 180 knots. Accordingly, the said line 16a, would show that a craft flying at 90 knots for a distance of 30 nautical miles would take 20 minutes (one-third of 1 hour), while the same craft flying at 90 knots for a distance of 60 nautical miles would take twice the time, i.e., 40 minutes (two-thirds of 1 hour).

The same line 16a would further show that to cover a distance of 30 miles in 20 minutes, the ground speed would be 90 knots, while for twice the distance in the same time the ground speed would be 180 knots.

Similarly, the appropriate constant time slant line 16 for a time of say 21 minutes (as see FIG. 1), would show that at a known ground speed of 150 knots the distance travelled would be 55 miles as read on the distance scale 11, while the slant line for 9 minutes at a known ground speed of 120 knots (as see FIG. 4), would show 18 miles as the distance that would be travelled.

The angularity of all of the constant time slant lines 16 relatively to the system of the orthogonally related distance scale 11 and ground speed scales 12—12 is plotted and linearly applied to the main body member 10 in accordance with the formula $D=RT$ wherein $D$ represents distance, $R$ represents rate of ground speed (in knots, miles per hour or kilometers per hour) and $T$ represents time in minutes, in which formula its several parameters are linearly related as graphically depicted by the straight line form of the sloping lines 16.

To facilitate easy and quick visual determination of the unknown parameter desired to be known, the main body member 10 of the computer is fitted with a pair of slides or cursors 17 and 18 which are movable not only relatively to one another but also relatively to their supporting member 10. These slides are each formed of suitable transparent material, such as plastic or the like, so that when operatively mounted upon their supporting member 10 the several scales and their coordinated system of lines shown on the front face of said member 10 are clearly visible.

The horizontally shiftable slide or cursor 17 is preferrable in the form of a narrow sleeve which embraces the member 10 and is horizontally shiftable lengthwise end to end thereof, while the slide or cursor 18, also preferably in the form of a narrow sleeve, embraces the front panel 19 of the slide 17 and is vertically slidable thereon from top to bottom edge of the member 10.

The slide 17 is provided on the transparent front panel portion 19 thereof with a straight vertically extending indexing line 20 running from top to bottom edge of the slide and thus transversely across the distance scale 11 and the time scale 13, as well as across the system of the horizontal parallel lines 15 and the angularly related constant time slant lines 16. Thus, by shifting the slide 17 lengthwise of main body member 10, the index line 20 of said slide which parallels the vertical lines 14 of the distance scale 11 may be brought into exact registry with any desired mileage point along the distance scale 11 or any desired point along time any of the slant lines of the time scale 13.

The vertically shiftable slide or cursor 18 is also provided upon its front surface with a relatively short horizontally extending line 21 having a clearly indicated center point or spot 22 designed to be brough into exact registry or coincidence with the line 20 of the slide 17. Thus, by shifting the cursor 18 along its supporting cursor 17 and then shifting the cursor 17 lengthwise of the computer, or vice versa, the center point or spot 22 of the cursor 18 may be brought into registry with the point of intersection of any one of the constant time slant lines 16 with any one of the distance or ground speed lines of the computer, depending upon what factor of the formula $D=RT$ is desired to be ascertained.

FIGS. 5, 6 and 7 are diagrammatic illustrations respectively showing use of the computer to determine the unknown one of the three factors of said formula. Thus, FIG. 5 illustrates use of the computer to determine the time required to cover a distance of 24 nautical miles at a ground speed of 120 knots. For this determination the vertical line 20 of the horizontally shiftable slide or cursor 17 is brought into registry with the 24 mile distance line of the computer and the vertically shiftable slide or cursor 18 is then set to bring its center point 22 in registry with the ground speed line for 120 knots. Thereupon, the constant tme slant line 16 in registry with the set point 22 of the cursor 17 is followed to its point of intersection with the time scale for a reading of 12 minutes as the time required.

FIG. 6 illustrates the determination of the ground speed required for a flight of 24 miles in twelve minutes of flying time. In this case, the horizontally shiftable cursor 17 is first set in registry with the 24 mile distance line after which the vertically shiftable cursor 18 is shifted along the cursor 17 until the point 22 is in registry with the 12 minute slant line 16 of the time scale 13. Thereupon, by reading along that one of the horizontal lines 15 which is intersected by the slope line at the set point 22 of the cursor 18 the required ground speed of 120 knots may be read on the scale 12.

FIG. 7 illustrates use of the computer to determine the distance which may be covered during a give period of time at a known ground speed. The example illustrated in this case is for determination of the distance travelled at a ground speed of 120 knots for twelve minutes of flight time. The vertical line 20 of the horizontally shiftable cursor 17 is set on the time scale 13 for 12 minutes and the center point 22 (shown as a black dot) of the vertically shiftable cursor 18 is set in registry with the horizontal ground speed for 120 knots. The horizontally shiftable cursor 17 is then moved to register the center 22 (shown as an open circle) of the cursor 18 with the constant time slant line 16 extending from the twelve minute point on the time scale 13 whereupon the vertical line 20 of the cursor 17 indicates a reading of 24 nautical miles on the distance scale 11.

The distance scale 11 of the computer of the present invention matches tbat of a particular map with which the computer is designed for coordinated use. Thus, the scale 11 of the illustrated computer matches exactly the nautical mileage scale of 1.500,000 used, for example, on the New Orleans Sectional Aeronautical Chart published by the United States Department of Defense, Federal Administration, Department of Commerce. Of course, if the map with which the computer is designed to be used is prepared upon a different scale of distances, be it in nautical or statutory miles or kilometers, the distance scale 11 of the computer would match that of the map and the constant time slant lines 16 would be all correspondingly related to the ground speed scale 12 and the time scale 13.

It will be apparent that by conjoint use of the computer with aeronautical and other navigational maps on which distances are linearly measured and which are prepared on a scale matching that of the computer of the present invention, point to point measurments of distances may be made on the map by use of the distance scale of the computer and thus flight plans may be expediously prepared prior to take off for a desired course of travel. Also, while in flight the computer may be employed to periodically and quickly check and determine, as may be desired or as may be necessary, the distance to be covered, the ground speed at which the craft is moving or the time required for travel from point to point where two of these three factors are known and the third is desired to be determined.

It will be understood that the computer as shown and described is illustrative and is not intended to be restricted to the particular scales and indicia as shown. Thus, the distance scale 11 of the computer may be graduated for a much greater range of distance than that illustrated in the accompanying drawings, and also the distance scale need not match that of any particular map. In the latter case, the time scale may be graduated in hours to facilitate use of the computer simply to determine either the time or rate of speed required to traverse a course of travel of known mileage which is not straight from point to point, as in an automobile travel map. Of course, in such form of the computer the distance scale would not be used to scale off distances on the map, but instead the cursors 17 and 18 would be used as described and as illustrated in FIGS. 5 and 6 to determine either time or rate of speed required to cover the known distance of travel.

Accordingly, the linearly related scales of the computer may be modified as indicated without departing from the general principles or real spirit of the invention, it being intended to claim the same broadly, as well as specifically, as indicated by the appended claims.

What is claimed as new and useful is:

1. A computer of the character described comprising
   a. an elongated flat main body member having applied to one surface thereof a distance scale graduated in sequentially numbered units of distance, a time scale graduated in minutes, and a ground speed scale graduated in said units of speed per hour, said distance and time scales respectively extending in parallel relation along opposite long edge portions of said member with said ground speed scale extending along at least one end portion of said member in orthogonal relation to said distance and time scales, said time scale having extended therefrom a series of slant lines respectively constituting linear representations of constant times corresponding to the minute graduations on said time scale,
   b. a horizontally shiftable distance cursor shiftable lengthwise along said body member having index means thereon for registry with a selected graduation on said distance scale, and
   c. a vertically shiftable ground speed cursor carried by and movable along said distance cursor having index means thereon for positionally adjusting said cursor in simultaneous registry with any one of said constant time slant lines at the point of its intersection with a graduation of one or the other of said distance and ground speed scales, whereby, when two of the three parameters of the distance-speed-time linear equation $D=RT$ are known, the unknown third parameter will be indicated on its appropriate scale by conjoint positional adjustment of said cursors relatively to one another within the limits of said distance and ground speed scales shown on the computer.

2. In a computer as defined in claim 1 wherein said constant time slant lines are predeterminedly plotted and applied to said member in the form of linear graphs respectively representing constant time for each graduation on said time scale.

3. In a computer as defined in claim 1 wherein said main body member is provided with a rectangular field which is bounded along its long sides by said distance and time scales and along its short sides by a pair of corresponding ground speed scales, said field being characterized by a system of two sets of orthogonally related spaced lines, one set of which are extensions of the distance scale graduations and the other set extensions of the ground speed scale, and a third set of said constant time slant lines extending angularly across said orthogonally related lines with each of said slant lines emanating from a different graduation on said time scale.

4. In a computer as defined in claim 1 wherein said cursors are respectively the form of sleeves, the first of which is slip-fitted upon said main body member and the second of which is slip-fitted upon the first cursor, the front panels at least of both of said cursors being transparent to expose to view the markings on the surface of said member which underlies said front panels.

5. In a computer as defined in claim 1 wherein the index means on said horizontally shiftable cursor is in the form of a straight line extending across and between said graduated distance and time scales of the computer in orthogonal relation thereto and the index means on said vertically shiftable cursor is in the form of a dot which is positionally adjustable along said horizontally shiftable cursor in registry with the indexing straight line thereof.

6. A computer as defined in claim 1 wherein said distance scale is graduated in units of distance matching those of the scale of an aeronautical or other navigational map with which said computer is designed to be used whereby said scale may serve to measure point to point straight line distances on said map.

* * * * *